Dec. 26, 1961  A. G. COX  3,014,434
VEHICLE SUSPENSION
Filed Jan. 26, 1960  2 Sheets-Sheet 1

INVENTOR
AUSTIN G. COX
BY Strauch, Nolan & Neale
ATTORNEYS

Dec. 26, 1961 A. G. COX 3,014,434
VEHICLE SUSPENSION
Filed Jan. 26, 1960 2 Sheets-Sheet 2
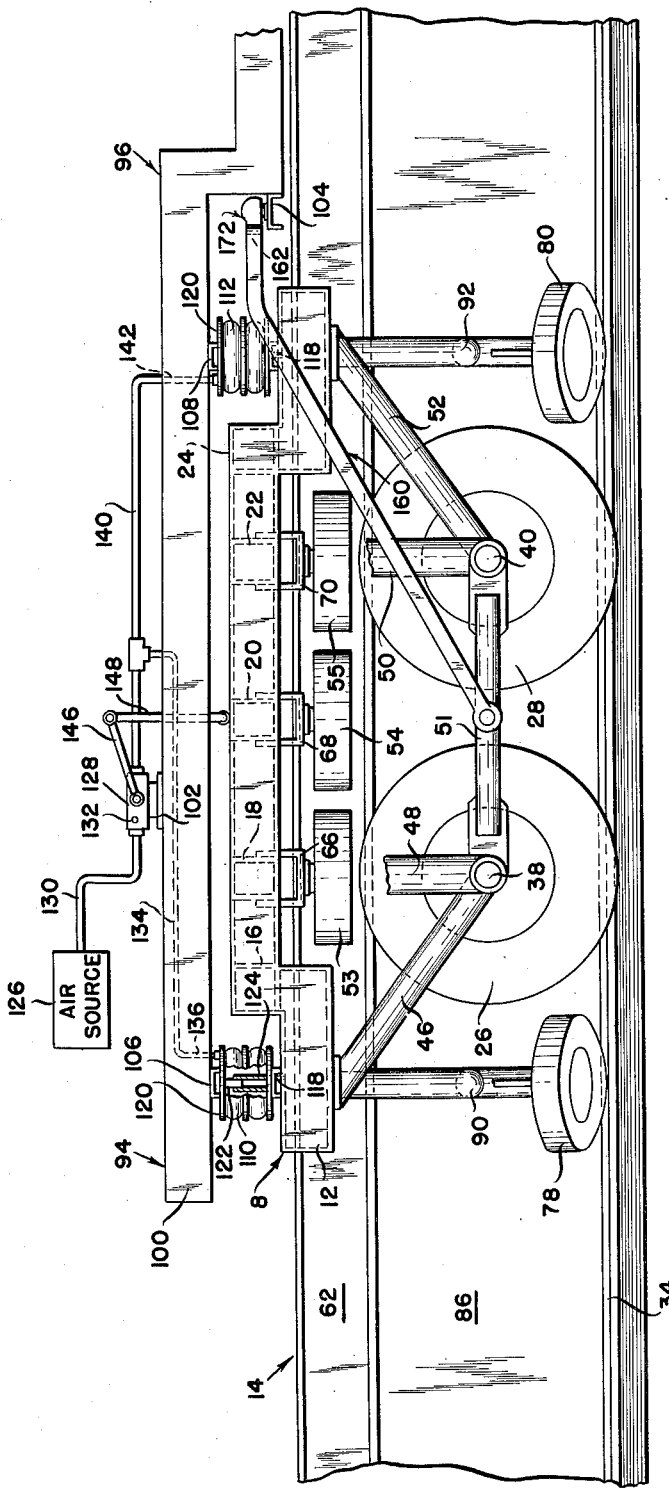
INVENTOR
AUSTIN G. COX
ATTORNEYS

United States Patent Office 3,014,434
Patented Dec. 26, 1961

3,014,434
VEHICLE SUSPENSION
Austin G. Cox, Houston, Tex., assignor to Alwac International, Inc., Nassau, Bahamas, a corporation of Panama
Filed Jan. 26, 1960, Ser. No. 4,655
6 Claims. (Cl. 105—145)

The present invention relates to improvements in suspensions for mono-beam supported vehicles and more particularly to the provision of pneumatic suspensions interposed between the trucks and frames of such vehicles. Specifically this invention relates to the provision of pneumatic suspensions for mono-beam supported vehicles of the type illustrated and described in co-pending application Serial No. 705,410, filed December 26, 1957, by Weldon F. Appelt for Elevated Track and Structure for Supporting the Coach for Movement Therealong.

The principal object of the present invention is to provide a pneumatic suspension interposed between the truck and vehicle body frame of a mono-beam supported vehicle which is effective to maintain a predetermined spacing between such frames with variations in load upon the vehicle frame while permitting such suspension to absorb momentary variations in such spacing due to imperfections in or obstructions on the supporting surface of the mono-beam to thereby provide a cushioning effect for the support of the vehicle frame.

A further object of the present invention is to provide a pneumatic suspension for mono-beam supported vehicles interposed between the vehicle frame and the truck frame while preventing canting of the truck relative to the vehicle frame in response to the application of accelerating and decelerating torques to the support roller elements of the vehicle truck.

These and other objects of the present invention will become more fully apparent by reference to the appended claims and as the following detailed description proceeds in reference to the accompanying drawings wherein:

FIGURE 3 is a side elevational view of the structure shown in FIGURE 1.

Figures 1, 2:
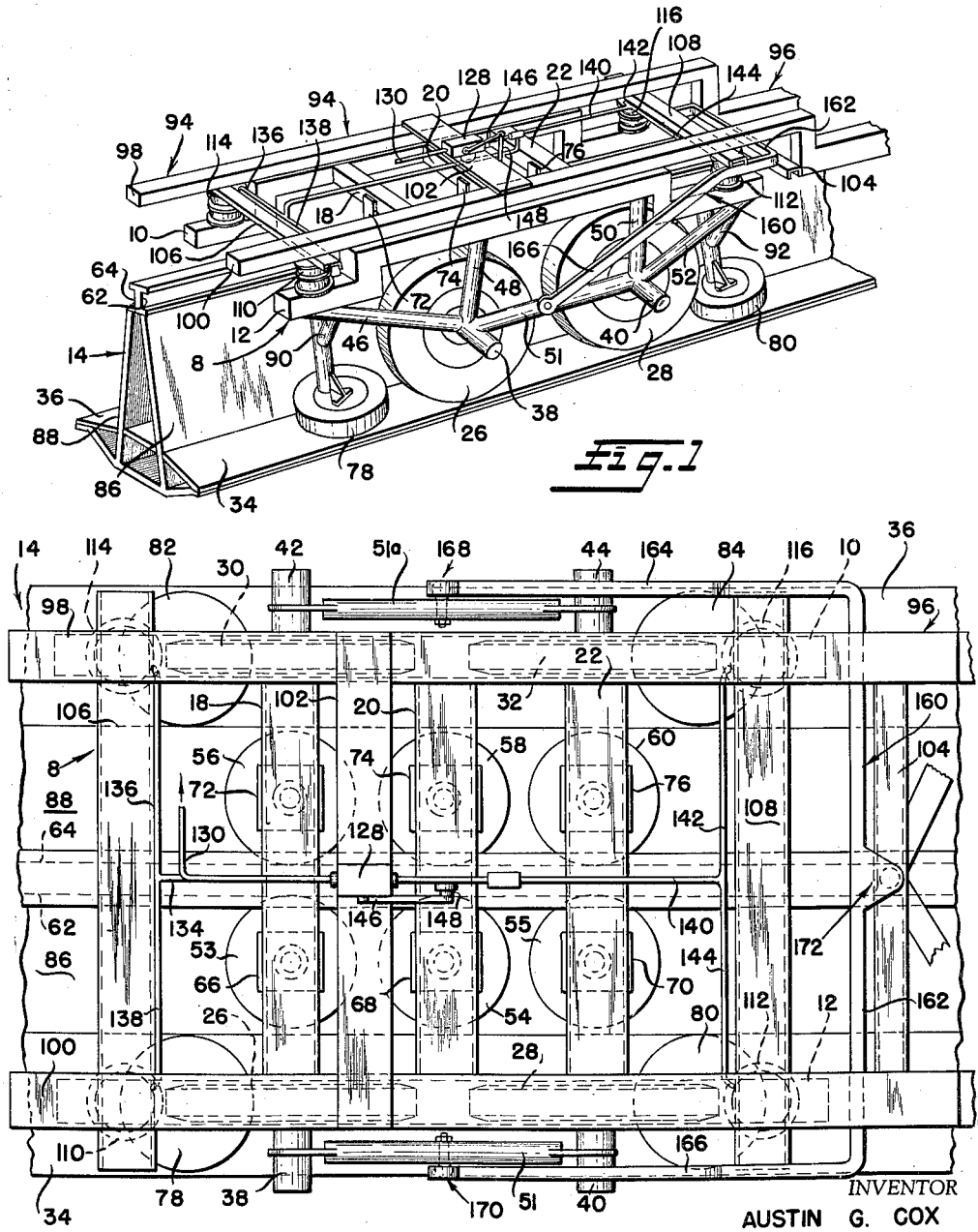
FIGURE 1 is a perspective view illustrating, upon a mono-beam, a truck supporting a portion of a vehicle frame by a pneumatic suspension constructed in accord with the principles of the present invention.
FIGURE 2 is a top plan view of the structure shown in FIGURE 1.

Referring now in detail to the drawings, and particularly to FIGURES 1 and 3, the truck frame 8 comprises a pair of hollow beams 10 and 12 extending longitudinally of the truck assembly at each side of the mono-beam 14 and rigidly interconnected above the mono-beam 14 by rigid transversely extending frame elements of hollow square cross section 16, 18, 20, 22 and 24 (FIGURE 3). The truck frame 8 is supported by a plurality of support roller elements, which may as illustrated be in the form of pneumatically tired wheels 26, 28, 30 and 32 (FIGURE 2), disposed at each side of the monobeam structure 14 and rollingly engaging the support surfaces 34 and 36 thereon (FIGURE 1). Wheels 26, 28, 30 and 32 are journalled respectively upon stub axles 38, 40, 42 and 44 (FIGURE 3) which are maintained in rigidly spaced relation to the frame members 12 and 10 by depending struts 46, 48, 50 and 52 as illustrated in FIGURES 1 and 3 in connection with the stub axles 38 and 40. A spacer strut 51 is rigidly interposed between the axles 38 and 40 and a like strut 51a is rigidly interposed between the stub axles 42 and 44.

The truck frame 8 is laterally positioned relative to the mono-beam structure 14 by upper guide rollers 53, 54, 55, 56, 58 and 60 (FIGURE 2) which are journalled about vertical axes for rolling engagement, with the surfaces 62 and 64 (FIGURE 1) on the mono-beam 14, being connected to the frame by downwardly projecting U-shaped supports 66, 68, 70, 72, 74 and 76 (FIGURE 2) fixed at their upper ends to the cross beams 18, 20 and 22. The truck frame 8 is further laterally guided by lower guide wheels 78, 80, 82 and 84 engaging the surfaces 86 and 88 (FIGURE 1) on the mono-beam 14 and rigidly connected to the frame 8 by struts such as 90 and 92 of the form illustrated in FIGURES 1 and 3.

Wheels 26, 28, 30 and 32 are cambered to roll normal to the support surfaces 34 and 36. In vehicles designed primarily for forward movement the wheels are also preferably toed-in to aid the central tracking of the truck along the beam.

As is most clearly illustrated in FIGURES 1 and 3, a portion 94 of the vehicle frame 96 overlies the truck frame 8 and comprises longitudinally extending beam members 98 and 100 directly overlying the beams 10 and 12 of the truck frame 8. Beam members 98 and 100 are maintained in rigid spaced relation by transverse frame members 102 and 104 and by inverted channel members 106 and 108. At the depressed ends of each of the beams 10 and 12, expansible pneumatic chambers 110, 112, 114 and 116 are provided. As is illustrated in detail in FIGURE 3 in connection with expansible chambers 110 and 112, the rigid bottom plates of expansible chambers 110, 112, 114 and 116 are rigidly connected at their lower faces to the top face of the depressed end regions of the beams 10 and 12 and are provided with fluid conduits 118 permitting fluid communication between the interior of the expansible chambers 110, 112, 114 and 116 and the hollow interior of the one of the beams 10 or 12 to which they are fixed with the result that expansible chamber 110 is in fluid communication with expansible chamber 112 through the interior of beam 12 and expansible chamber 114 is in fluid communication through the interior of beam 10 with the expansible chamber 116. The upper faces of the expansible chambers 110, 112, 114 and 116 are in the form of rigid metal scuff plates 120 the upper faces of which are in sliding engagement with the depending arms of the inverted channel shaped members 106 and 108 as illustrated in FIGURES 1 and 3 so that the frame 96 is free to slide laterally relative to the expansible chambers 110, 112 114 and 116 thereby permitting articulation of the frame 96 relative to the truck frame 8. Internally each of the expansible chambers 110, 112, 114 and 116 is provided with telescoping tubular guide members 122 and 124 rigidly fixed respectively to the top and the bottom plates of the expansible chambers to prevent lateral displacement of the top plate of the expansible chamber relative to the bottom plate thereof while permitting free axial expansion and contraction of these chambers within predetermined limits.

Air is supplied to the expansible chambers 110, 112, 114 and 116 in parallel from a suitable compressed air source 126 through a common control valve 128. Control valve 128 is connected to air source 126 by conduit 130 and is provided with an atmospheric exhaust port 132. Control valve 128 is connected to expansible chambers 110 and 112 through a longitudinally extending conduit 134 of suitable flexible construction to accommodate the possible relative movement between truck frame 8 and vehicle frame 96 and branch conduits 136 and 138 as illustrated in FIGURES 1 and 3 and is connected to expansible chambers 112 and 116 by a conduit 140 of suitable flexible construction and branch conduits 142 and 144. By this construction, opening of the valve 128 will supply air simultaneously and under equal pressure to all four of the expansible chambers 110, 112, 114 and 116 from the air source 126 and shifting of the valve 128 to its exhaust position will simultaneously connect each of the expansible chambers 110, 112, 114 and 116 to the exhaust port 132 of the valve 128 to reduce the air pressure within the expansible chambers 110, 112, 114 and 116.

The valve 128 is actuated by a lever 146 and a depending actuating link 148 which is guided for vertical movement upon the transverse member 102 of the vehicle frame 96 and abuts the top of the cross frame member 20 of the truck frame 8.

The valve 128 is so constructed that pivotal movement of the lever 146 in a counterclockwise direction from its neutral position illustrated in FIGURE 3 will connect the conduit 130 to the conduits 134 and 140 to place the air source 126 in fluid communication with each of the expansible chambers 110, 112, 114 and 116. Clockwise movement of the lever 146 from its neutral position as illustrated in FIGURE 3 will connect the exhaust port 132 to the conduits 134 and 140 to thereby connect each of the expansible chambers 110, 112, 114 and 116 to atmosphere. Thus, when an increase in load is applied to the frame 96 causing the frame portion 94 to more closely approach the frame 8 of the truck, link 148 will be forced upwardly relative to frame portion 94 to impart counterclockwise movement to the lever 146 and thereby connect the air source of 126 to the expansible chambers 110, 112, 114 and 116 to increase the fluid pressure therein and restore the predetermined normal spacial relation between the frame portion 94 and the truck frame 8 which thereby restores lever 146 to its neutral position. Conversely the load upon the frame 96 is decreased causing the frame portion 94 to rise relative to the truck frame 8 under the influence of the fluid pressure within the expansible chambers 110, 112, 114 and 116, clockwise rotation will be imparted to the lever 146 thereby connecting the expansible chambers 110, 112, 114 and 116 to atmosphere to exhaust air therefrom until the frame portion 94 is restored to the predetermined desired spacing relative to the truck frame 8 at which time the lever 146 will have been restored to its neutral position in which the expansible chambers 110, 112, 114 and 116 are not connected to either the air source 126 or to atmosphere through port 132.

As has been explained previously, the expansible chambers 110 and 112 are interconnected through the hollow interior of the beam 12 of the truck frame 8 and the expansible chambers 114 and 116 are connected in fluid communication through the hollow interior of the beam 10 of the truck frame 8. In this construction the vehicle frame beams 100 and 98 at the opposite sides of the vehicle are in effect supported by separate pneumatic chambers of large capacity only the relatively small end portions of which are expansible and contractible. The result of this construction is not only continuous equalization of the fluid pressure between the expansible chambers at the opposite longitudinal ends of the truck to assure leveling but also a soft air cushioned support for the vehicle frame relative to the truck frame. Thus, should the support wheels 26, 28, 30 and 32 encounter an obstruction on their support surfaces 34 and 36 causing them to rise relative to the vehicle frame 96, while the valve 128 will be actuated to increase the pressure within the expansible chambers 110, 112, 114 and 116, there will be a delayed action in restoring the normal predetermined relation between the frame portion 94 and the truck frame 8, due to the fact that air must be supplied in sufficient quantity not only to increase the pressure within the expansible chambers 110, 112, 114 and 116 but also to increase the pressure within the large volume within the interior of the hollow beams 10 and 12. Thus if the relative displacement between the frame portion 94 and the truck frame 8 is due to an obstruction on the support surfaces 34 and 36, the required momentary upward displacement of the truck frame 8 will be absorbed by the pneumatic suspension without imparting any material movement to the vehicle frame portion 94 as the normal predetermined relation between the vehicle frame portion 94 and the truck frame 8 will be restored due to the wheels 26, 28, 30 and 32 passing the obstruction before the pneumatic system has an opportunity to restore the predetermined spacial relation 94 and the truck frame 8 by an increase in pressure within the expansible chambers 110, 112, 114 and 116.

The path of movement of truck frame 8 relative to the vehicle frame 96 is defined by a yoke-shaped snubber bar 160 having, as illustrated in FIGURE 2, a transversely extending portion 162 and longitudinally and downwardly extending inclined portions 164 and 166 at opposite sides of the truck frame 8. The arms 164 and 166 are universally connected to the mid-points of the struts 51 and 51a respectively by suitable rubber-bushed universal joints 168 and 170 and the transverse portion 162 of the snubber bar 160 is similarly universally connected at 172 to the transverse beam 104 of the vehicle frame 96. By this construction, the truck frame 8 is free to pivot relative to the vehicle frame 96 about a vertical axis through the pivotal connection 172 and is free to move vertically toward or from the frame 96 in a path defined by the pivotal movement of the snubber bar 160 about a horizontal transverse axis through the pivot 172 and a parallel horizontal transverse axis through the coaxial pivots 168 and 170.

Each of the wheels 26, 28, 30 and 32 is equipped with a suitable, preferably internally expansible, brake mechanism interposed between the wheels 26, 28, 30 and 32 and the stub axles 38, 40, 42 and 44 respectively and each of these wheels may be provided with suitable driving motors if this is a power truck. Application of the brakes to decelerate the rate of rotation of the wheels 26, 28, 30 and 32 is effective to impart a turning torque tending to produce rotation of the truck frame 8 about an axis defined by the line of engagement of the leading pair of the wheels 26 and 30 or 28 and 32 with the support surfaces 34 and 36. In other words when the truck is moving to the left as viewed in FIGURE 3, application of the brakes will tend to produce rotation of the truck frame 8 about the line of engagement of wheels 26 and 30 with the surfaces 34 and 36 and if the vehicle is moving to the right as viewed in FIGURE 3 when the brakes are applied, the truck frame 8 will tend to rotate about the line of engagement of the wheels 28 and 32 with the surfaces 34 and 36. The snubber bar 160 is effective to prevent this turning movement. If the vehicle is moving to the left as viewed in FIGURE 1 when the brakes are applied, the turning torque tending to produce counterclockwise rotation of the frame 8 will be absorbed by tensile stress in the snubber bar 160 and if the vehicle is moving to the right as viewed in FIGURE 3, the attempted clockwise rotation of the frame 8 upon the application of the brakes will be absorbed by compression stress imparted to the snubber bar 160. Thus when the brakes are applied all of the wheels 26, 28, 30 and 32 are maintained in engagement with the supporting surfaces 34 and 36 by the operation of this snubber bar 160. Similarly the snubber bar 160 will maintain the wheels 26, 28, 30 and 32 in engagement with the surfaces 34 and 36 upon acceleration of the wheels 26, 28, 30 and 32 if the assembly shown is a power truck.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle adapted to travel along a monobeam track having upwardly facing running surfaces and laterally facing running surfaces, a truck assembly comprising a frame supporting load carrying wheels for travel along said upwardly facing surfaces and guide wheels for travel along said laterally facing surfaces, a vehicle frame having a portion overlying said truck frame, a plurality of expansible chamber means interposed between said vehicle frame portion and said truck frame adjacent the opposite ends of said truck frame, means including said expansible chamber means for maintaining a predetermined vertical spacing between said frame portion and said truck frame under varying load conditions, each of said expansible chamber means being rigidly connected at one end to said truck frame and laterally slidably engaged with said vehicle frame portion at the opposite end to permit free relative articulation between said truck frame and said vehicle frame in a horizontal plane, and a snubber bar universally connected to the opposite sides of said truck at laterally aligned points and universally connected to said frame portion at a single point adjacent an end of said truck frame.

2. The combination defined in claim 1 wherein said expansible chamber means comprises at each side of said vehicle frame a pair of expansible chambers at opposite longitudinal ends of said truck frame and means defining a fixed volume fluid chamber extending between and in fluid communication with said longitudinally spaced expansible chambers and having a volume substantially greater than the aggregate volume of said expansible chambers, a source of air at a superatmospheric pressure, valve means for selectively connecting said expansible chambers to said source, to atmosphere and for isolating said expansible chambers from both said air source and atmosphere, and means responsive to variations in the spacing between said frame portion and the said truck frame from a predetermined norm for actuating said valve means to restore said spacing to said predetermined norm.

3. The combination defined in claim 1 wherein said snubber bar straddles said truck frame and said aligned points define a common axis parallel to the axis of rotation of said load carrying wheels.

4. The combination as defined in claim 1 wherein at least a pair of load carrying wheels are provided on each side of said truck frame and wherein said snubber bar is pivotally connected to said truck frame at points defining an axis lying substantially midway between the axes of rotation of said load carrying wheels.

5. The combination defined in claim 4 wherein the said points lie in a common horizontal plane with the axes of rotation of said load carrying wheels.

6. In a vehicle adapted to travel along a monobeam track having a pair of spaced apart parallel upwardly facing running surfaces separated by an upwardly projecting central web providing laterally facing running surfaces, a truck assembly comprising a frame supporting spaced sets of load carrying wheels for travelling along the respective upwardly facing running surfaces and guide wheels for travel along said laterally facing surfaces, a vehicle frame having a portion overlying said truck frame, a plurality of expansible chamber means interposed between the vehicle frame portion and said truck frame adjacent the opposite ends of said truck frame and at opposite sides of said central track web, means including said expansible chamber means for maintaining a predetermined vertical spacing between said frame portion and said truck frame under varying load conditions, each of said expansible chamber means being rigidly connected at one end to said truck frame and laterally slidably engaged with said vehicle frame portion at the opposite end to permit free relative articulation between said truck frame and said vehicle frame in a horizontal plane, and a generally U-shaped snubber bar universally connected to said frame portion at a single point adjacent one end of said truck frame and the bottom of said U and the free ends of the arms of said snubber bar being universally connected to the opposite sides of said truck at laterally aligned points.

References Cited in the file of this patent
UNITED STATES PATENTS

| | | |
|---|---|---|
| 1,008,290 | Verge | Nov. 7, 1911 |
| 2,274,016 | Verplanck | Feb. 24, 1942 |
| 2,670,201 | Rossman | Feb. 23, 1954 |
| 2,691,420 | Fox et al. | Oct. 12, 1954 |

FOREIGN PATENTS

| | | |
|---|---|---|
| 535,447 | Canada | Jan. 8, 1957 |